United States Patent
Skoptsov et al.

(10) Patent No.: US 9,623,397 B2
(45) Date of Patent: Apr. 18, 2017

(54) SYSTEM FOR PROCESSING HYDROCARBON FUELS USING SURFAGUIDE

(71) Applicant: H Quest Partners, LP, Pittsburgh, PA (US)

(72) Inventors: George L. Skoptsov, Pittsburgh, PA (US); Alan A. Johnson, Calgary (CA)

(73) Assignee: H Quest Partners, LP, Pittsburgh, PA (US)

( * ) Notice: Subject to any disclaimer, the term of this patent is extended or adjusted under 35 U.S.C. 154(b) by 126 days.

(21) Appl. No.: 14/727,109

(22) Filed: Jun. 1, 2015

(65) Prior Publication Data
US 2015/0258523 A1 Sep. 17, 2015

Related U.S. Application Data

(63) Continuation-in-part of application No. 14/464,260, filed on Aug. 20, 2014, now Pat. No. 9,044,730.
(Continued)

(51) Int. Cl.
*C10G 15/08* (2006.01)
*C10G 15/12* (2006.01)
(Continued)

(52) U.S. Cl.
CPC .......... *B01J 19/126* (2013.01); *B01J 19/088* (2013.01); *C10G 1/00* (2013.01); *C10G 15/08* (2013.01);
(Continued)

(58) Field of Classification Search
CPC ...... B01J 19/126; B01J 2219/126; C10G 1/00
See application file for complete search history.

(56) References Cited

U.S. PATENT DOCUMENTS 4,010,089 A 3/1977 Stowell et al.
4,454,022 A 6/1984 Shoji et al.
(Continued)

FOREIGN PATENT DOCUMENTS

CN 2821468 Y 9/2006
EP 2606003 A1 6/2013
(Continued)

OTHER PUBLICATIONS

Moisan et al., "Multitube surface-wave discharges for increased gas throughput at atmospheric pressure", Journal of Applied Physics, vol. 83, No. 11, Jun. 1, 1998, pp. 5691-5701.
(Continued)

*Primary Examiner* — Renee Robinson
*Assistant Examiner* — Derek Mueller
(74) *Attorney, Agent, or Firm* — Fox Rothschild LLP

(57) ABSTRACT

A system for processing hydrocarbon materials, comprising a hydrocarbon feedstock source; a process gas source; a waveguide; and a reaction tube structure. The process gas source comprises one or more sources of gases selected from the group consisting of helium, argon, krypton, neon, xenon, methane, propane, butane, ethane, acetylene, propylene, butylene, ethylene, carbon monoxide, carbon dioxide, water vapor, hydrogen, and nitrogen. The waveguide comprises a lateral portion comprising housing having a first end portion configured to be connected to a microwave generator, a closed opposite end portion, a primary axis extending from the first end portion to the second end portion, and a central portion having an opening, wherein the central portion has a depth that is smaller than a corresponding depth of the first end portion and the second end portion, and a coaxial portion having a first end portion connected to the opening and a lateral dimension that is perpendicular to the primary axis. The reaction tube structure comprises an outer wall
(Continued)

made of a dielectric material, and is configured such that when hydrocarbon feedstock from the feedstock source and process gas from the process gas source are fed into the reaction tube structure and microwaves are received in the waveguide, one or more surface waves are propagated in the reaction tube structure to form a plasma within the reaction tube structure and cause the feedstock and process gas to react and form into a product stream, and wherein the reaction tube structure has a lateral dimension that is perpendicular to the lateral portion and parallel to the coaxial portion, and the reaction tube structure is connected to a second end of the coaxial portion.

18 Claims, 7 Drawing Sheets

Related U.S. Application Data

(60) Provisional application No. 61/867,900, filed on Aug. 20, 2013.

(51) Int. Cl.
    *C10G 1/00* (2006.01)
    *B01J 19/12* (2006.01)
    *B01J 19/08* (2006.01)

(52) U.S. Cl.
    CPC ....... *C10G 15/12* (2013.01); *B01J 2219/0877* (2013.01); *B01J 2219/0879* (2013.01); *B01J 2219/0886* (2013.01); *B01J 2219/0892* (2013.01); *B01J 2219/1215* (2013.01); *B01J 2219/1218* (2013.01); *B01J 2219/1227* (2013.01); *B01J 2219/1266* (2013.01); *B01J 2219/1269* (2013.01)

(56) References Cited

U.S. PATENT DOCUMENTS

| | | |
|---|---|---|
| 4,487,683 A | 12/1984 | Bozzuto |
| 5,679,215 A | 10/1997 | Barnes et al. |
| 6,224,836 B1 | 5/2001 | Moisan et al. |
| 6,506,584 B1 | 1/2003 | Chandler et al. |
| 7,022,505 B2 | 4/2006 | Chandler et al. |
| 7,581,549 B2 | 9/2009 | Johnson et al. |
| 7,799,119 B2 | 9/2010 | Zakrzewski et al. |
| 8,657,999 B2 | 2/2014 | Lissianski et al. |
| 2005/0167260 A1 | 8/2005 | Kong et al. |
| 2009/0038932 A1 | 2/2009 | Denslow et al. |
| 2010/0307960 A1 | 12/2010 | Lissianski et al. |
| 2010/0308036 A1 | 12/2010 | Tomita et al. |
| 2012/0024843 A1 | 2/2012 | Lissianski et al. |
| 2012/0082593 A1 | 4/2012 | Stiller et al. |
| 2012/0186972 A1 | 7/2012 | Li et al. |
| 2013/0165710 A1 | 6/2013 | Hemmings et al. |
| 2013/0213795 A1 | 8/2013 | Strohm et al. |

FOREIGN PATENT DOCUMENTS

| | | |
|---|---|---|
| JP | H10310777 A | 11/1998 |
| RU | 2462500 C2 | 9/2012 |
| WO | WO-2011047446 A1 | 4/2011 |
| WO | WO-2011131207 A1 | 10/2011 |

OTHER PUBLICATIONS

Verkerk, Arjan, "Surface-wave discharges in a XeCl laser mixture", A search for novel microwave applications, Master Thesis, Jul. 2005.

Strohm et al., Lowering the Cost and Environmental Impact of Direct Coal Liquefaction through Wave Liquefaction(TM) Technology, published Jun. 2, 2013.

SYSTEM FOR PROCESSING HYDROCARBON FUELS USING SURFAGUIDE

RELATED APPLICATIONS AND CLAIM OF PRIORITY

This patent document is a continuation-in-part of U.S. patent application Ser. No. 14/464,260, filed Aug. 20, 2014, which claims priority to U.S. Provisional Application No. 61/867,900, filed Aug. 20, 2013. The disclosures of each priority application are fully incorporated by reference. This patent document is also related to U.S. patent application Ser. Nos. 14/464,284 and 14/464,345, both filed on Aug. 20, 2014.

BACKGROUND

Because of the world's increasing demand for petroleum products, it has been desirable to find alternative hydrocarbon feedstocks for fuel. For example, it is known to convert coal to liquid fuels using a family of processes known as coal liquefaction. Such processes are disclosed in, for example, U.S. Pat. No. 4,487,683, the disclosure of which is fully incorporated herein by reference. It is also known to upgrade liquid hydrocarbon to fuel-quality products. Such processes are disclosed in, for example, U.S. Pat. No. 7,022,505, the disclosure of which is fully incorporated herein by reference.

Most of the traditional methods of coal liquefaction have significant energy requirements and environmental impact. Conventional techniques for direct coal liquefaction will generally result in lower $CO_2$ emissions compared to indirect techniques, but will typically require relatively higher temperatures and higher pressure to enable liquefaction reactions and hydrogen transfer from the hydrogen donor to obtain significant product yield and quality. Ideally such a process would be highly flexible in that it should readily admit to operation on small, medium and large commercial scale.

One method that offers the potential to process hydrocarbon fuels at lower environmental costs than existing commercial systems utilizes plasma processing. In plasma processing, hydrocarbons are fed into a reaction chamber in which they are ionized to form plasma, for example by exposure to a high intensity field. In the plasma state the constituents of the feed material are dissociated and may either be extracted separately, recombined or reacted with additional feed materials, depending on the required output product. Electromagnetic-induced plasmas, in particular, offer the potential for highly efficient cracking of both gas and liquid feed materials due to superior energy coupling between energy source, plasma and feedstock. Such plasmas have been shown to have a catalytic effect, as a result of coupling between the electromagnetic, particularly microwave, field and the feed material, that increases the rate of reaction, which in turn reduces the time for which the feed material must be maintained in the plasma state, i.e. the residency time.

It is, however, difficult to scale up reaction chambers that use microwaves generated for commercial plasma operations, and many current liquefaction and hydrocarbon upgrading processes are practically and/or economically unable to meet the scale required for commercial production. Accordingly, improved systems for converting and upgrading hydrocarbon fuel products are needed.

This document describes methods and systems that are directed to the problems described above.

SUMMARY

In a general aspect, the embodiments disclose a system for processing hydrocarbon materials, including a hydrocarbon feedstock source. The system also includes a source of process gas such as helium, argon, krypton, neon, xenon, methane, propane, butane, ethane, acetylene, propylene, butylene, ethylene, carbon monoxide, carbon dioxide, water vapor, hydrogen, and nitrogen. The system may include a waveguide. The waveguide has a lateral portion comprising housing having a first end portion configured to be connected to a microwave generator, a closed opposite end portion, a primary axis extending from the first end portion to the second end portion, and a central portion having an opening, wherein the central portion has a depth that is smaller than a corresponding depth of the first end portion and the second end portion, and a coaxial portion having a first end portion connected to the opening and a lateral dimension that is perpendicular to the primary axis. The system may also include a reaction tube structure comprising an outer wall made of a dielectric material, which has a lateral dimension that is perpendicular to the lateral portion and parallel to the coaxial portion, and the reaction tube structure is connected to a second end of the coaxial portion. The reaction tube structure is configured such that when hydrocarbon feedstock from the feedstock source and process gas from the process gas source are fed into the reaction tube structure and microwaves are received in the waveguide, one or more surface waves are propagated in the reaction tube structure to form a plasma within the reaction tube structure and cause the feedstock and process gas to react and form into a product stream. The hydrocarbon feedstock source may include a source of coal, bitumen, oil sands, tar sands, oil shale, petroleum resids, asphaltenes, pre-asphaltenes or other vitrinite or kerogen-containing materials.

Additionally and/or optionally the opening is located on a side of the waveguide to allow for the passage of microwaves received in the waveguide into the reaction tube in the direction generally perpendicular to the primary axis.

In some embodiments, the reaction tube structure also includes an end that is positioned to receive the hydrocarbon feedstock from the hydrocarbon feedstock source at a location that is proximate to a location where the reaction tube structure is connected to a second end of the coaxial portion. In an embodiment, the reaction tube structure is positioned to receive the hydrocarbon feedstock from the hydrocarbon feedstock source through the waveguide.

Alternatively, the coaxial portion is the hydrocarbon feedstock source.

The waveguide may include at least one plasma column positioned to have a longest dimension that is parallel to the primary axis and configured to generate the plasma and transmit the generated plasma into the reaction tube structure. During operation, at least a part of the product stream may be formed in the at least one plasma column. In this embodiment, the reaction tube may include a wide portion and a tapered portion, and the tapered portion is positioned to receive the plasma column.

In some embodiments, the waveguide may include a plurality of additional openings in the central portion, and a plurality of additional reaction tube structures, each of which is positioned to be received by one of the additional openings.

Additionally and/or optionally, the system for processing hydrocarbon materials may include hydrocarbon feed stock source and a process gas source of helium, argon, krypton, neon, xenon, methane, propane, butane, ethane, acetylene, propylene, butylene, ethylene, carbon monoxide, carbon dioxide, water vapor, hydrogen, and nitrogen. The system may also include a waveguide comprising a lateral portion comprising housing having a first end portion configured to be connected to a microwave generator, a closed opposite end portion, a primary axis extending from the first end portion to the second end portion, and a central portion having an opening, wherein the central portion has a depth that is smaller than a corresponding depth of the first end portion and the second end portion, and a transmitter portion having a first end portion connected to the opening and a lateral dimension that is at a first angle of from about 0 degree to about 90 degrees to the primary axis. A reaction tube structure comprising an outer wall made of a dielectric material a lateral dimension that is perpendicular to the lateral portion and at a second angle complementary to the transmitter portion may be connected to a second end of the transmitter portion. The reaction tube structure may be configured such that when hydrocarbon feedstock from the feedstock source and process gas from the process gas source are fed into the reaction tube structure and microwaves are received in the waveguide, one or more surface waves are propagated in the reaction tube structure to form a plasma within the reaction tube structure and cause the feedstock and process gas to react and form into a product stream. In some embodiments, the first angle 90 degrees and the second angle is 0 degree.

In an embodiment, the transmitter portion is coaxial to the reaction tube structure. Optionally, the transmitter portion is offset from a central axis of the reaction tube structure.

The reaction tube structure may include an end that is positioned to receive the hydrocarbon feedstock from the hydrocarbon feedstock source at a location that is proximate to a location where the reaction tube structure is connected to a second end of the transmitter portion. In this embodiment, the transmitter portion may act as the hydrocarbon feedstock source. The reaction tube structure may be positioned to receive the hydrocarbon feedstock from the hydrocarbon feedstock source through the waveguide.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

This document describes systems for processing hydrocarbon materials, such as through liquefaction or through upgrading into a fuel-grade material or intermediate material. The processing may include altering the arrangement of carbon and hydrogen atoms and/or removal of heteroatoms such as sulphur, nitrogen, and oxygen. The examples described below will use coal as an example of the material to be processed. However, the system may be used to process various naturally occurring hydrocarbon-based materials such as fossil hydrocarbons and biomass. Examples of fossil hydrocarbons may include coal, bitumen, oil sands, tar sands, oil shale, petroleum resids, resins, asphaltenes, pre-asphaltenes and other vitrinite and kerogen-containing materials and fractions or derivatives thereof. In some embodiments, the feedstock may be comprised of solid or partially solid, gaseous and/or liquid materials. The system may also be used to process hydrocarbon gases such as natural gas, methane, propane, ethylene, and other hydrocarbon compounds, and their mixtures, which are normally in a gaseous state of matter at room temperature and atmospheric pressure. The system also may be used to process other hydrocarbon-based materials such as municipal waste, sludge, or other carbon-rich materials.

Figure 1:
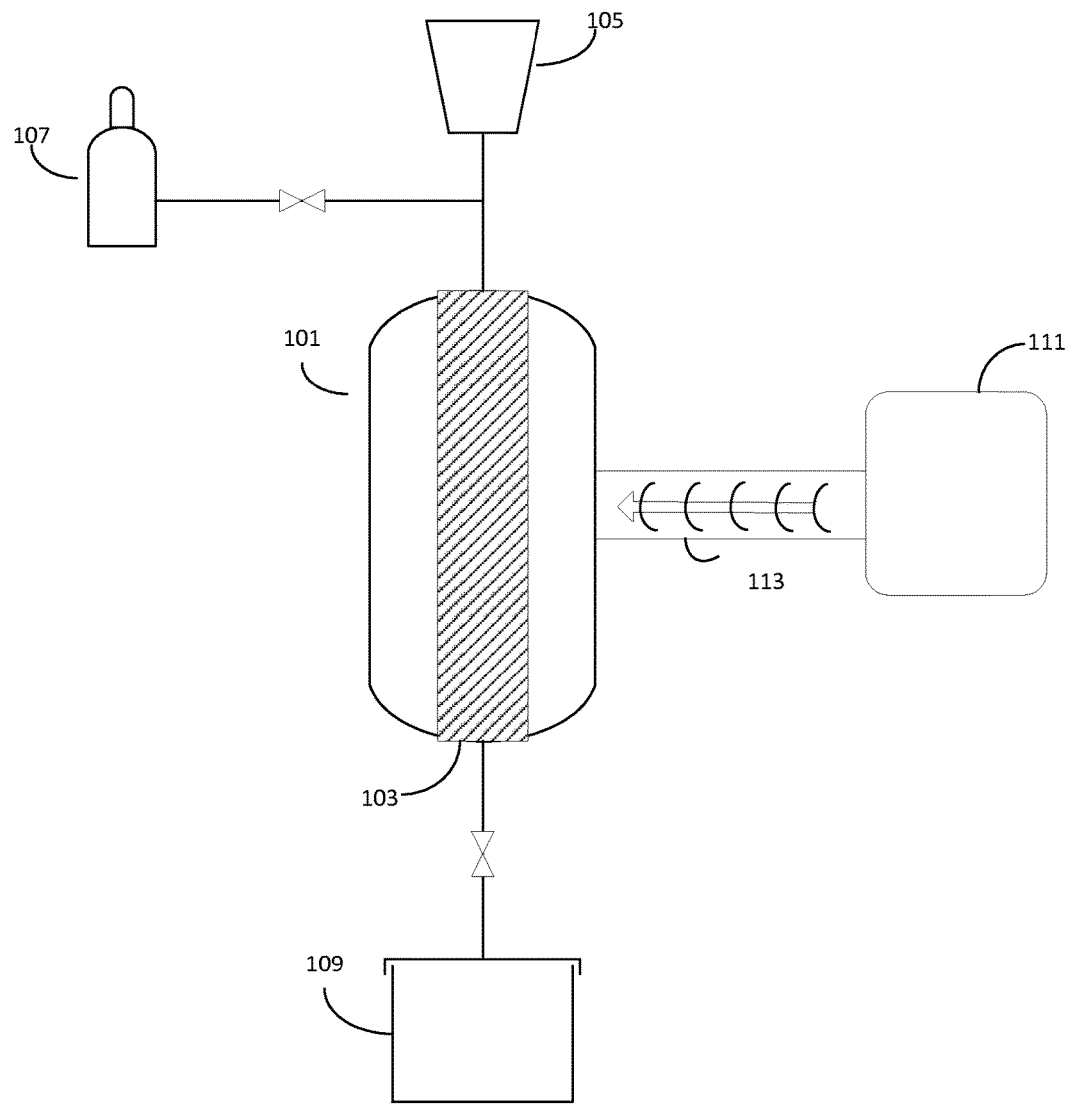
FIG. 1 is a flow schematic of a system for processing hydrocarbons.

FIG. 1 illustrates an example of a system for processing coal or other hydrocarbons. A reaction chamber 101 may be used to convert the feedstock into a liquid fuel, or upgrade the feedstock to a fuel product or intermediate product. The reaction chamber may receive feedstock from one or more hydrocarbon feedstock sources 103, such as a coal hopper. The feedstock may be in powder form (such as coal particles), optionally entrained in a gas (e.g., a mixture of natural gas, hydrogen or argon). In certain embodiments, the feedstock may be in vapor phase, when process gas temperature is higher than the boiling point of the feedstock or feedstock fractions and compounds. It may also be in liquid form as an atomized spray, droplets, emulsions, or aerosols entrained in a process gas. The hydrocarbon feedstock may be supplemented with any suitable catalyst or supplemental material, such as various metals, metal oxide salts or powders, carbon material, or other metallic materials or organometallic species which may enhance the reaction caused by microwave radiation as described below. Examples of catalysts may include materials containing iron, nickel, cobalt, molybdenum, carbon, copper, silica, oxygen, or other materials or combinations of any of these materials. The feedstock may be delivered via any suitable means, such as in powdered form and forced into the system by an injection device 118.

A flow of process gas from a process gas source 107 may be injected or otherwise delivered to the hydrocarbon feedstock before, after, or as it enters the reaction chamber 101. The process gas will react with the feedstock in the reaction chamber to yield the final product. The process gas may include, for example, hydrogen, methane or other compounds of hydrogen and carbon. Multiple process gas sources 107 may be available so that a combination of process gases is directed into the reaction chamber. An example process gas combination includes an inert gas such as argon, helium, krypton, neon or xenon. The process gas also may include carbon monoxide (CO), carbon dioxide ($CO_2$), water vapor ($H_2O$), methane ($CH_4$), propane ($C_3H_8$), butane ($C_4H_{10}$), ethane ($C_2H_6$), other hydrocarbon gases ($C_nH_{2n+n}$, $C_nH_n$, $C_nH_n$, where n=2 through 6), and hydrogen ($H_2$) gases.

The system includes a microwave generator 111, along with a waveguide 113 that directs radiation from the generator 111 into the chamber 101. The reaction chamber may include a reaction tube 103 that has an outer wall made of quartz, borosilicate glass, alumina, sapphire, or another suitable dielectric material that enhances reaction of materials within the tube when microwave radiation is directed into the chamber 101. When provided at a suitable intensity and time duration, the microwave radiation resonates within the chamber 101, and causes a plasma to form within the reaction tube 103. The reaction may include processes such as chemical vapor deposition, gasification, thermal pyrolysis, radical reaction chemistry, ion reactions, microwave-enhanced reactions, and/or ion sputtering. The result of the reaction may be a product stream comprising a plurality of products characterized by different chemical and/or physical properties than the original reactant, as a result of rearrangement of atoms within the molecules, change in number of atoms per molecule, or number of molecules present, that may be delivered to one or more product storage vessels 109.

The reaction may occur at relatively low bulk process temperatures and pressures. For example, conversion and upgrading may occur with average reaction chamber pressures between 0.1 and 10 atmospheres, temperatures between −182° C. and 200° C. (the average reaction chamber temperature) and between 200° C. and 1600° C. (localized plasma temperature), and residence times between 0.001 and 600 seconds. Other parameters are possible.

To date, processes such as those shown in FIG. 1 have been applied to small, research-scale systems in which the reaction tube 103 has a diameter of about 25 mm. There are practical considerations that may hinder the use of microwaves in a large scale system. For example, in microwave plasma reactors one or more rapidly oscillating (at, for example, 2.45 GHz) electromagnetic fields may accelerate free electrons of a process gas, which may lead to their collision with nearby neutral species. These collisions may transfer energy to the neutral species, whose temperature and/or excitation levels increase, and eventually result in their losing an electron, which then becomes free and can itself be accelerated by the electromagnetic fields. As this process continues, the number of excited and/or charged species builds up. However, the charged species constantly lose energy due to collisions with neutral species and emissions due to orbital electrons falling to a lower state. Consequently, the charged species themselves may leave the energy input zone, resulting in overall energy loss. Once the energy loss is equal to energy input, plasma may enter a stable state. Generally, once plasma has been ignited, energy input may be lowered below the energy input level that was required to initiate the process. The process may lead to two scale-up problems: (a) plasma generation, and (b) energy transmission.

Firstly, plasma generation must take place in a constrained volume because larger volume may lead to a bigger spread of energy and thus lower energy density. Hence, the energy input may not be enough to initiate or sustain the plasma in a larger volume reaction tube. Furthermore, unless the gas is constrained, it may not remain within the energy input zone, and the plasma may not be sustained.

Secondly, since plasma has charged species and electrons, it is conductive, and thus provides for poor penetration by oscillating electromagnetic fields. Hence, as the plasma volume increases, energy input into the plasma interior may become limited Thirdly, increasing the size of the reaction tube would also require increasing scale of the microwave generator to a level that may be cost-prohibitive.

To increase the capacity of the system, one would consider increasing the feed rate into the tube, but such activity may cause the feedstock to coalesce within and plug the tube before processing is complete.

Figure 2:
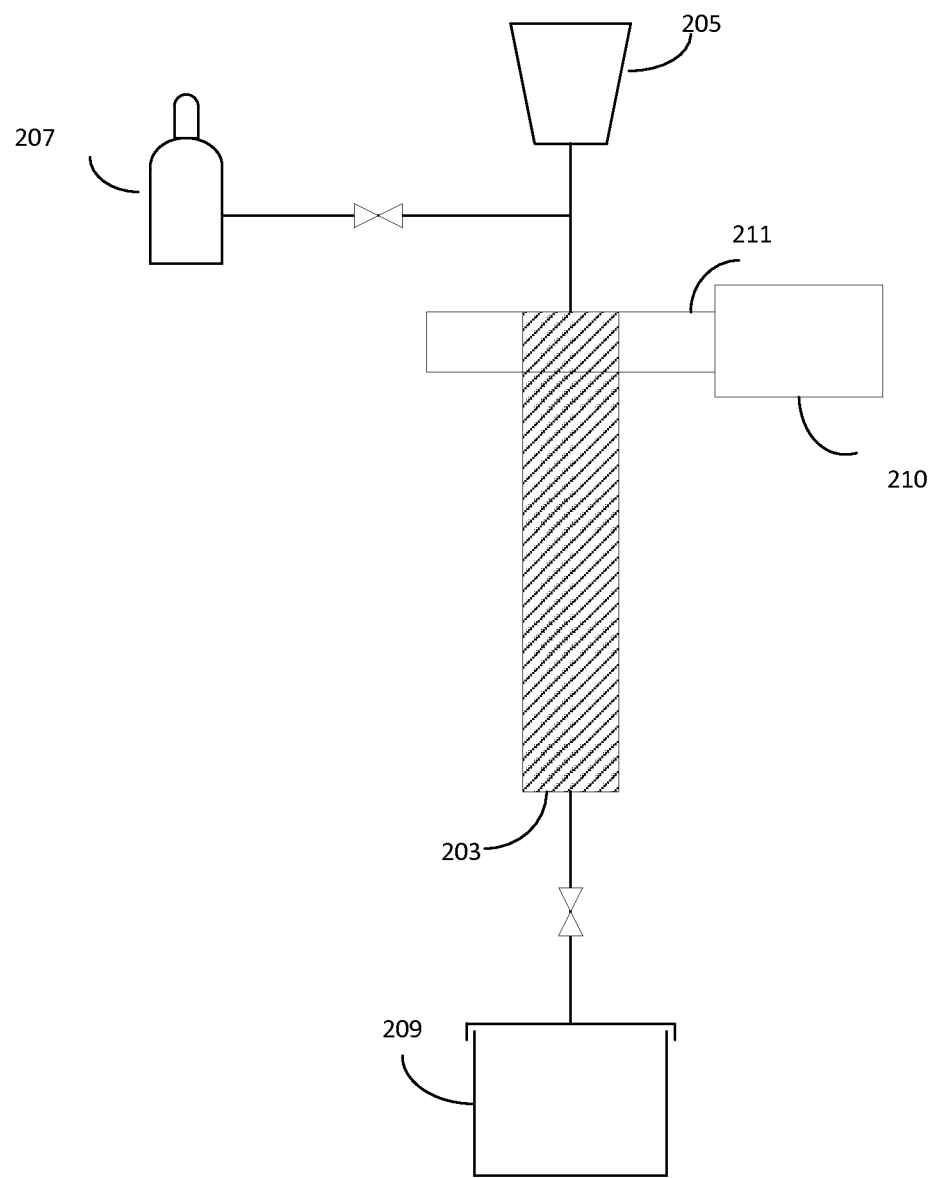
FIG. 2 is a flow schematic of an alternate system for processing hydrocarbons.

To address this problem, an alternate embodiment uses a surfaguide with the reaction tube. The alternate embodiments may use any of the feedstocks, catalysts, process gases, and other parameters described above. However, in the alternate system, the microwaves are launched by a wave launcher having a circular gap. As shown in FIG. 2, the surfaguide may include a rectangular waveguide 211 for receiving and launching microwave energy from a microwave generator 210 into the reaction tube 203 of the reaction chamber as feedstock and catalysts from feed sources 205, 207 are received into the reaction tube 203. As shown, the waveguide 211 includes an elongated cavity having an axis (length) that extends away from the microwave generator 210. The reaction tube 203 is received into an opening 218 (circular gap) of the waveguide 211 and extends from and optionally through the waveguide 211 in a direction that is perpendicular to the length axis of the waveguide 211. The opening 218 of the waveguide 211 may have sidewalls that form part of the housing of the waveguide. Thus, the opening 218 may not be fully "open" but instead may be partially or fully formed by sidewalls of the housing. Typically, the sidewalls of the opening 218 will include a gap through which waves are launched toward the reaction tube 203.

Here, the feedstock supply 207, 205 passes through the waveguide 211 as or shortly after the feedstock is received into the reaction tube 203. The energy from the waveguide 211 passes to the reaction tube 203 as a surface wave that may cause the formation of a plasma or electrical discharge, along with the activation or ionization of gases, within the reaction tube 203, thus converting or upgrading the feedstock for delivery into a product storage facility 209. There may be microwave discharge (plasma) within the cavity induced by the microwave energy entering the cavity. Microwave energy may also may induce electric discharges in ionized gas that rapidly and locally heat surrounding gas and hydrocarbon feedstocks.

Figure 3:
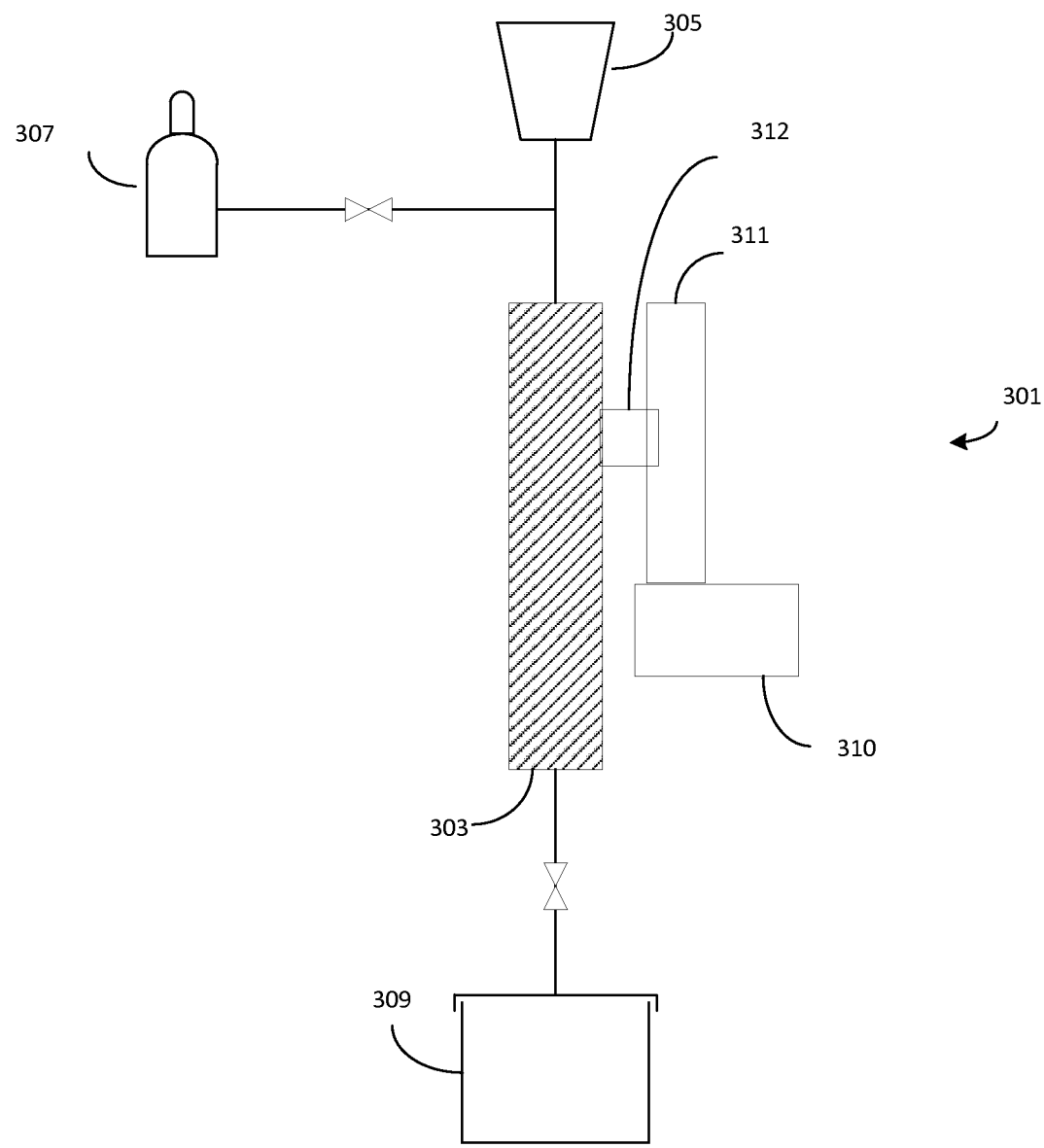
FIG. 3 is a flow schematic of an alternate system for processing hydrocarbons.

FIG. 3 illustrates an alternate embodiment of a surfatron 301 with an integrated wave launcher of a coaxial type with a circular gap for forming a field configuration, and for receiving and launching microwave energy from a microwave generator 310 into the reaction tube 303 as feedstock and catalysts from feed sources 305, 307 are received into the reaction tube 303. As shown, the surfatron 301 is coaxial in that it includes a first transmission structure 311 having an elongated cavity with an axis (length) that extends away from the microwave generator 310. The length axis of the first transmission structure 311 is perpendicular to the longest axis of the reaction tube 303. A second transmission structure 312 has a first end that connected to the first transmission structure 311, a second end that is connected to the reaction tube 303, and a position so that the second waveguide's longest axis is to perpendicular the longest axis of the first waveguide 311 and that of the reaction tube 303. Here, "connected to" may include a physical connection, or a structure in which one element is received into an opening of the other element. Here, the feedstock supplies 307, 305 do not pass through the surfatron but instead enter the reaction tube 303 at another location.

When the generator 310 operates, energy is received by the cavity of the first transmission structure 311. The energy passes to the reaction tube 303 via the second transmission structure 312 as a surface wave. The energy may cause the formation of a plasma within the reaction tube 303, thus converting or upgrading the feedstock for delivery into a product storage facility 309. In this embodiment and in other embodiments, the surfatron may include an adjustable capacitive coupler that can be used to tune the operation frequency of the waveguide. In some embodiments, the operation frequency may be between 100 MHz-2.4 GHz.

Figure 4A:
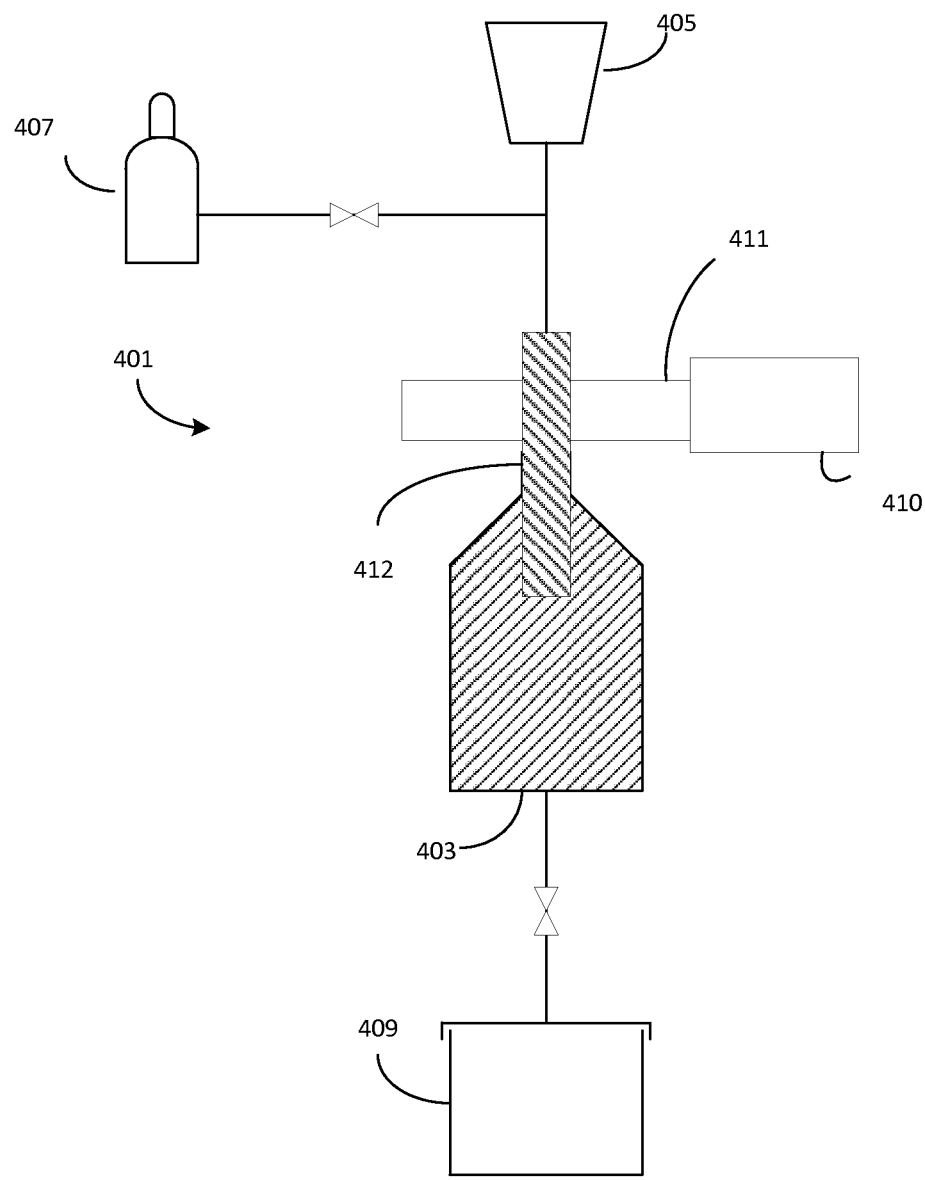
FIG. 4A is a flow schematic of an alternate system for processing hydrocarbons.
Figure 4B:
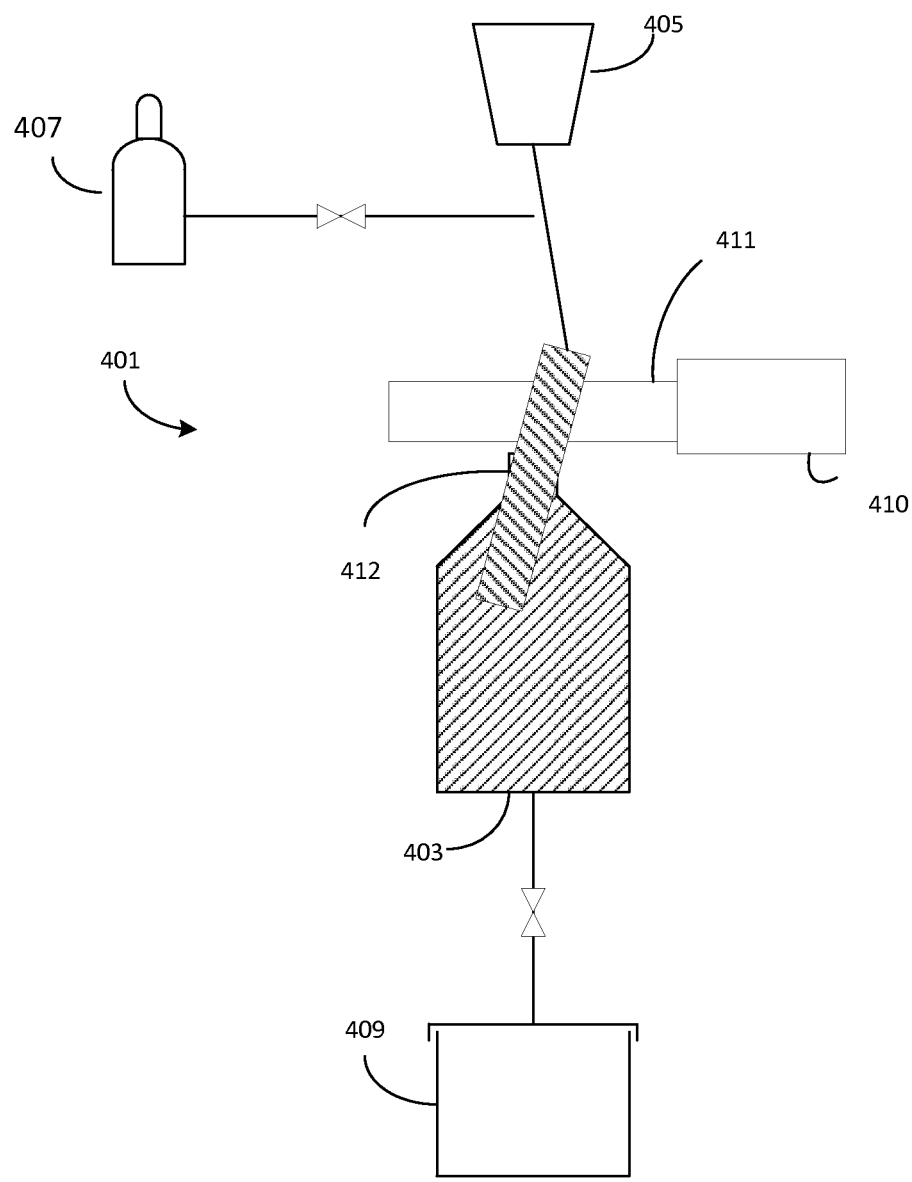
FIG. 4B is a flow schematic of an alternate system for processing hydrocarbons.

FIGS. 4A and 4B illustrate an alternate embodiment of a waveguide surfatron 401 in which an integrated wave launcher uses both waveguide 411 and transmitter 412 components to launch microwave energy from a microwave generator 410 into the reaction chamber 403 as feedstock and catalysts from feed sources 405, 407 are received into the chamber 403.

The transmitter component 412 may be made from an electrically conductive material such as aluminum, zinc, gold, silver, copper, nickel, iron, steel, lead, etc., or their alloys. In certain embodiments, the transmitter component 412 may be solid. In certain other embodiments, the transmitter component 412 may be hollow and may additionally and/or alternatively serve as the feed tube.

The waveguide includes a lateral waveguide component 411 that receives microwaves from the microwave generator 410. The waveguide also includes a transmitter component 412 that intersects the lateral component 411 at an angle, and directs the microwaves as a surface wave into the reaction tube 403. In an embodiment, the transmitter component 412 may intersect the lateral component 411 of the waveguide at a 90 degree angle (FIG. 4A). In certain other embodiments, the transmitter component 412 may intersect the lateral component 411 at an angle between 0 degree and 90 degrees (FIG. 4B). In an embodiment, the the transmitter component 412 may intersect the lateral component 411 at an angle between 10 degrees and 80 degrees. In yet another embodiment, the the transmitter component 412 may intersect the lateral component 411 at an angle between 20 degrees and 70 degrees. In some other embodiments, the the transmitter component 412 may intersect the lateral component 411 at an angle between 30 degrees and 60 degrees. In an embodiment, the the transmitter component 412 may intersect the lateral component 411 at an angle between 40 degrees and 50 degrees. In an embodiment, the the transmitter component 412 may intersect the lateral component 411 at an angle between 10 degrees and 20 degrees. In yet another embodiment, the the transmitter component 412 may intersect the lateral component 411 at an angle between 20 degrees and 40 degrees. In some other embodiments, the the transmitter component 412 may intersect the lateral component 411 at an angle between 70 degrees and 90 degrees. In an embodiment, the the transmitter component 412 may intersect the lateral component 411 at an angle between 40 degree and 50 degrees. Examples of intersection angles may include, without limitation, 10 degrees, 15 degrees, 20 degrees, 30 degrees, 40 degrees, 45 degrees, 50 degrees, 60 degrees, 70 degrees, and 80 degrees.

The longest dimension of the reaction tube 403 may intersect with the transmitter component 412 at an angle that is complementary to the angle at which the transmitter component 412 that intersects with the lateral component 411 of the waveguide. The longest dimension of the reaction tube 403 is perpendicular to that of the lateral waveguide component 411.

Optionally, the reaction tube may be the transmitter component 412 along with a larger chamber 403. If so, the transmitter component may be considered a reaction tube in which a portion of the plasma begins to form.

The tube or chamber 403 is connected to a first end of the transmitter component 412, and a second end of the transmitter component 412 is connected to the lateral waveguide component 411. Here, "connected to" again may include a physical connection, or a structure in which one element is received into an opening of the other element. The energy may cause the formation of a plasma within the reaction tube 403, thus converting or upgrading the feedstock for delivery into a product storage facility 409. As shown, the tube/chamber 403 has a wider portion and a tapered portion, so that the tapered portion is connected to the transmitter component 412. The waveguide surfatron may include good tuning capabilities of a surfatron and the high power capabilities of a surfaguide, and may be included in a large scale reaction chamber.

In certain embodiments, the transmitter component 412 may additionally and/or alternatively serve as the plasma chamber by generating the plasma in the transmitter component and delivering the generated plasma into the reaction chamber 403. In certain embodiments, at least some part of the conversion of feedstock to product may occur in the transmitter component 412.

In certain embodiments, the transmitter component 412 may be coaxial with the reaction tube 403. In certain other embodiments, the axis of the transmitter component 412 may be offset with respect to the axis of the reaction tube 403.

Figure 5:
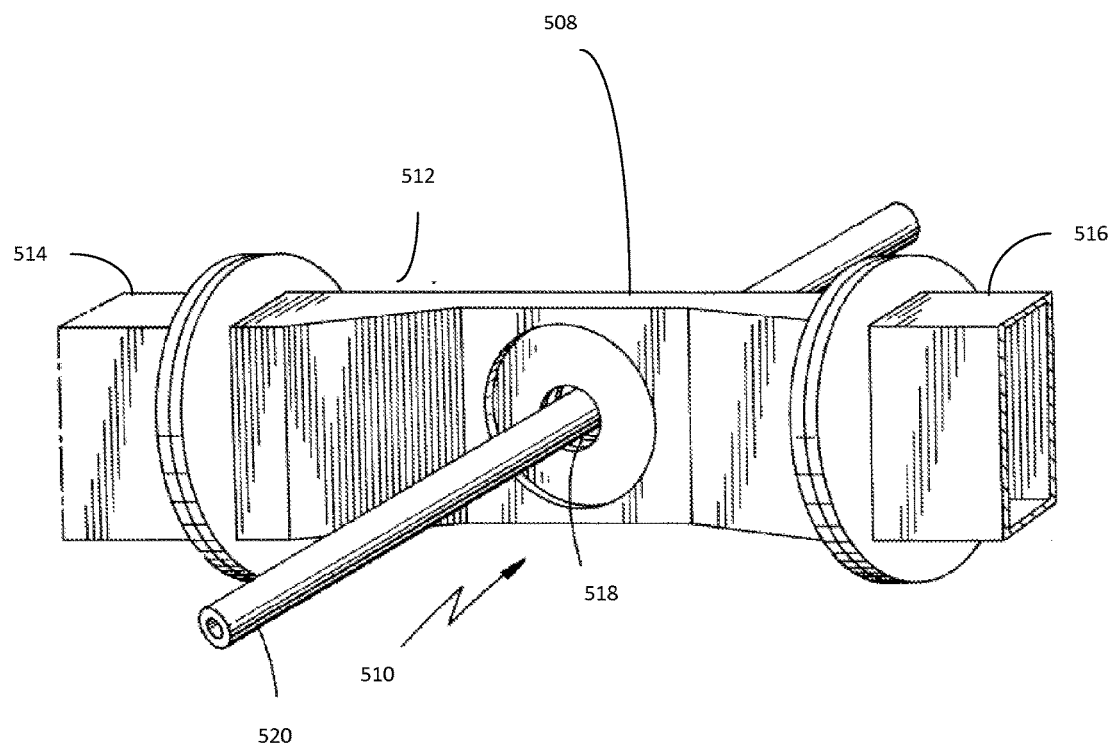
FIG. 5 is an illustration of an example of a surfaguide that may be used with the disclosed system.

FIG. 5 illustrates an example of a surfaguide 510 that may be used in connection with the embodiments described above. The surfaguide 510 includes a housing 512 made of an electrically conductive material. Example materials include metals with high conductivity such as copper, aluminum, zinc, brass, iron, steel and alloys and combinations thereof. Optionally, housing may be plated or otherwise coated with, or contain particles of, an additional conductive material such as gold or silver. One end 514 of the housing is configured to be connected to the output of a microwave generator, while the opposite end 516 is closed to contain the generated waves. As shown, the housing includes a central portion 508 with a depth dimension that is smaller than the depth dimension (front face to rear face based on the orientation shown in FIG. 5) of the ends 514, 516. The central portion 508 includes a slot 518 through which the reaction tube 520 passes. The slot 518 may be circular. The reaction tube 520 is positioned so that its length is substantially perpendicular to the depth dimension of the housing 512. Examples of such a surfaguide 510 are described in more detail in U.S. Pat. Nos. 6,224,836, and 7,799,119 the disclosures of which are fully incorporated herein by reference. In operation, the housing 512 concentrates the radiation that is recovered from the microwave generator, via an opening at end 514, onto the tube 520 so as to propagate an electromagnetic surface wave within the tube 520. When the surface wave interacts with the feedstock and other reaction materials, it causes the generation of a plasma within the tube. In certain embodiments, the length of the plasma created by the surfaguide may be longer. The interior of the housing may include a plunger and/or a capacitive coupler that can be used to adjust the frequency of the electromagnetic waves propagated by the waveguide during operation.

Figure 6:
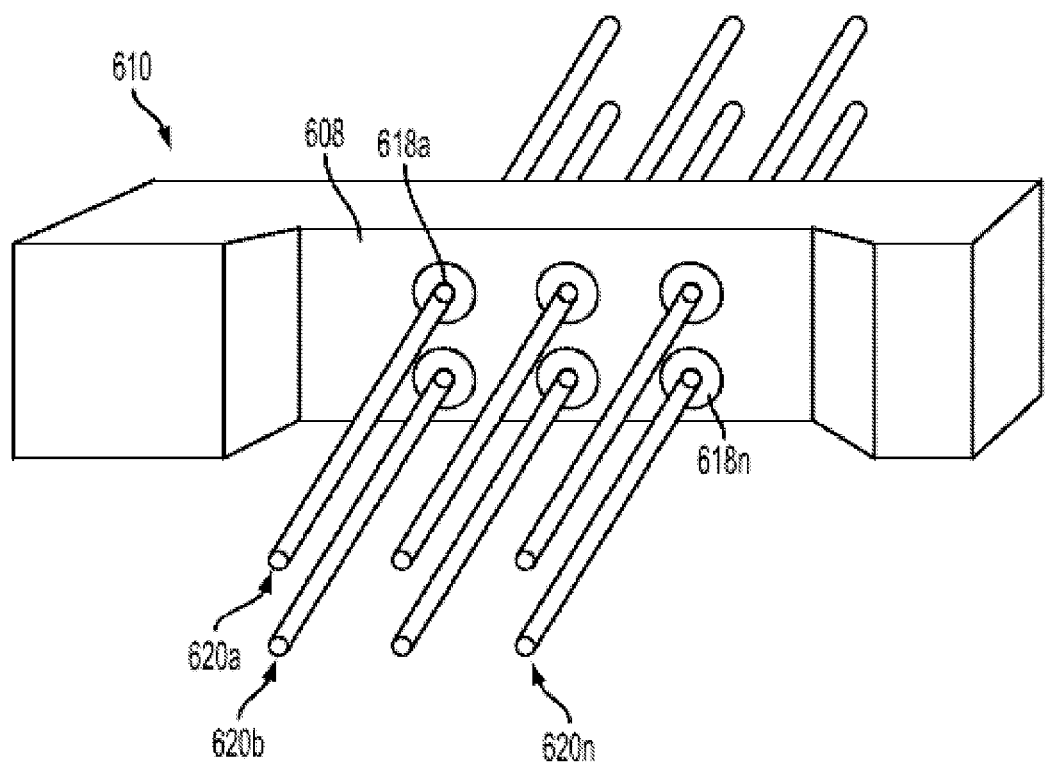
FIG. 6 is an illustration of an alternate example of a surfaguide that may be used with the disclosed system.

FIG. 6 illustrates an alternate embodiment where processing capacity of the system may be increased by including a surfaguide 610 whose central portion 608 includes multiple circular gaps 618a . . . 618n, each of which is configured to receive a reaction tube 620a . . . 620n. In this way, material may be processed in multiple tubes at multiple times. Alternatively, the various tubes may have varying diameters or may be made of varying materials to allow for selectable variations in frequencies or other characteristics of the waves propagated within the tubes, to allow for selective processing of different materials within a single system.

Alternatively and/or additionally, in an alternate embodiment processing capacity of the system may be increased by generating plasma externally using surfatrons, surfaguides, and/or a combination, and pumping the plasma into the reaction chamber. The system may include plasma columns to deliver plasma into the reaction chamber. In certain embodiments, at least some part of the conversion of feedstock to product may occur in the plasma columns. In certain embodiments, the plasma columns may also deliver microwave energy into the reaction chamber.

In an embodiment, the product stream may include upgraded fuel products that may include medium weight hydrocarbons. In certain embodiments, the medium weight hydrocarbons may include hydrocarbons having 5 to 30 carbon atoms. In certain other embodiments, the product stream may include an abundance of hydrocarbons with at least one of the following characteristics; low boiling points, low carbon number, low molecular weights, high hydrogen to carbon ratios, and increased percentage of paraffin and/or napthene structures.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for processing hydrocarbon materials, comprising:
   a hydrocarbon feedstock source;
   a process gas source, wherein the process gas source comprises one or more sources of gases selected from the group consisting of helium, argon, krypton, neon, xenon, methane, propane, butane, ethane, acetylene, propylene, butylene, ethylene, carbon monoxide, carbon dioxide, water vapor, hydrogen, and nitrogen;
   a waveguide comprising:
      a lateral portion comprising a housing having a first end portion configured to be connected to a microwave generator, a closed opposite end portion, a primary axis extending from the first end portion to the closed end portion, and a central portion having an opening, wherein the central portion has a depth that is smaller than a corresponding depth of the first end portion and the second end portion, and
      a coaxial portion having a first end portion connected to the opening and a lateral dimension that is perpendicular to the primary axis; and
   a reaction tube structure comprising an outer wall made of a dielectric material, wherein the reaction tube structure is configured such that when hydrocarbon feedstock from the feedstock source and process gas from the process gas source are fed into the reaction tube structure and microwaves are received in the waveguide, one or more surface waves are propagated in the reaction tube structure to form a plasma within the reaction tube structure and cause the feedstock and process gas to react and form into a product stream, and wherein the reaction tube structure has a lateral dimension that is perpendicular to the lateral portion and parallel to the coaxial portion, and the reaction tube structure is connected to a second end of the coaxial portion.

2. The system of claim 1, wherein the product stream comprises a fuel product having 5-30 carbon atoms per molecule.

3. The system of claim 1, wherein the opening is located on a side of the waveguide to allow for the passage of microwaves received in the waveguide into the reaction tube in the direction generally perpendicular to the primary axis.

4. The system of claim 1, wherein the reaction tube structure also comprises an end that is positioned to receive the hydrocarbon feedstock from the hydrocarbon feedstock source at a location that is proximate to a location where the reaction tube structure is connected to a second end of the coaxial portion.

5. The system of claim 4, wherein the reaction tube structure is positioned to receive the hydrocarbon feedstock from the hydrocarbon feedstock source through the waveguide.

6. The system of claim 1, wherein the waveguide further comprises at least one plasma column positioned to have a longest dimension that is parallel to the primary axis and configured to generate the plasma and transmit the generated plasma into the reaction tube structure.

7. The system of claim 6, wherein, during operation, at least a part of the product stream is formed in the at least one plasma column.

8. The system of claim 6, wherein the reaction tube comprises a wide portion and a tapered portion, and the tapered portion is positioned to receive the plasma column.

9. The system of claim 1, wherein:
   the waveguide further comprises a plurality of additional openings in the central portion; and
   the system further comprises a plurality of additional reaction tube structures, each of which is positioned to be received by one of the additional openings.

10. The system of claim 1, wherein the hydrocarbon feedstock source comprises a source of coal, bitumen, oil sands, tar sands, oil shale, petroleum resids, asphaltenes, pre-asphaltenes or other vitrinite or kerogen-containing materials.

11. A system for processing hydrocarbon materials, comprising:
   a hydrocarbon feedstock source;
   a process gas source, wherein the process gas source comprises one or more sources of gases selected from the group consisting of helium, argon, krypton, neon, xenon, methane, propane, butane, ethane, acetylene, propylene, butylene, ethylene, carbon monoxide, carbon dioxide, water vapor, hydrogen, and nitrogen;
   a waveguide comprising:
      a lateral portion comprising a housing having a first end portion configured to be connected to a microwave generator, a closed opposite end portion, a primary axis extending from the first end portion to the closed end portion, and a central portion having an opening, wherein the central portion has a depth that is smaller than a corresponding depth of the first end portion and the second end portion, and
      a transmitter portion having a first end portion connected to the opening and a lateral dimension that is at a first angle of from about 0 degree to about 90 degrees to the primary axis; and a reaction tube structure comprising an outer wall made of a dielectric material, wherein the reaction tube structure is configured such that when hydrocarbon feedstock from the feedstock source and process gas from the process gas source are fed into the reaction tube structure and microwaves are received in the waveguide, one or more surface waves are propagated in the reaction tube structure to form a plasma within the reaction tube structure and cause the feedstock and process gas to react and form into a product stream, and wherein the reaction tube structure has a lateral dimension that is perpendicular to the lateral portion and at a second angle complementary to the transmitter portion, and the reaction tube structure is connected to a second end of the transmitter portion.

12. The system of claim 11, wherein the product stream comprises a fuel product having 5-30 carbon atoms per molecule.

13. The system of claim 11, wherein the transmitter portion is coaxial to the reaction tube structure.

14. The system of claim 11, wherein the transmitter portion is offset from a central axis of the reaction tube structure.

15. The system of claim 11, werein the first angle is 90 degrees and the second angle is 0 degree.

16. The system of claim 11, wherein the reaction tube structure also comprises an end that is positioned to receive the hydrocarbon feedstock from the hydrocarbon feedstock source at a location that is proximate to a location where the reaction tube structure is connected to a second end of the transmitter portion.

17. The system of claim 16, wherein the reaction tube structure is positioned to receive the hydrocarbon feedstock from the hydrocarbon feedstock source through the waveguide.

18. The system of claim 11, wherein:
 the waveguide further comprises a plurality of additional openings in the central portion; and
 the system further comprises a plurality of additional reaction tube structures, each of which is positioned to be received by one of the additional openings.

* * * * *